US012655037B1

(12) United States Patent
Omran et al.

(10) Patent No.: US 12,655,037 B1
(45) Date of Patent: Jun. 16, 2026

---

(54) NANOCOMPOSITE FOR IMMOBILIZING CONTAMINANTS DISPOSED IN AN AQUEOUS MEDIUM

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/261,185

(22) Filed: Jul. 7, 2025

(51) Int. Cl.
| | |
|---|---|
| *C02F 1/28* | (2023.01) |
| *B01J 6/00* | (2006.01) |
| *B01J 21/16* | (2006.01) |
| *B01J 23/18* | (2006.01) |
| *B01J 27/24* | (2006.01) |
| *B01J 35/45* | (2024.01) |
| *B01J 35/61* | (2024.01) |
| *B01J 35/63* | (2024.01) |
| *B01J 37/08* | (2006.01) |
| *C02F 101/20* | (2006.01) |
| *C02F 101/30* | (2006.01) |

(52) U.S. Cl.
CPC ................. *C02F 1/288* (2013.01); *B01J 6/00* (2013.01); *B01J 21/16* (2013.01); *B01J 23/18* (2013.01); *B01J 27/24* (2013.01); *B01J 35/45* (2024.01); *B01J 35/613* (2024.01); *B01J*

*35/633* (2024.01); *B01J 37/08* (2013.01); *C02F 2101/20* (2013.01); *C02F 2101/30* (2013.01)

(58) Field of Classification Search
None
See application file for complete search history.

(56) References Cited

FOREIGN PATENT DOCUMENTS

| | | |
|---|---|---|
| CN | 106694016 B | 4/2019 |
| CN | 108579773 B | 12/2019 |
| CN | 111346623 B | 2/2023 |

(Continued)

OTHER PUBLICATIONS

Jiang, L., et al. In-situ synthesis of direct solid-state dual Z-scheme WO3/g-C3N4/Bi2O3 photocatalyst for the degradation of refractory pollutant. Applied Catalysis B: Environmental 227 (2018) 376-385. (Year: 2018).*

(Continued)

*Primary Examiner* — Anthony J Zimmer
*Assistant Examiner* — Zachary John Baum
(74) *Attorney, Agent, or Firm* — Oblon, McClelland, Maier & Neustadt, L.L.P.

(57) ABSTRACT

A method of immobilizing contaminants disposed in an aqueous medium, the method including contacting the aqueous medium with a particulate crystalline nanocomposite for a sufficient contact time to permit adsorption of the contaminants. The particulate crystalline nanocomposite includes: a monoclinic $Bi_2O_3$ crystalline phase; a $CaSiO_3$ crystalline phase, and, a graphitic-$C_3N_4$ crystalline phase, wherein at least a fraction of the graphitic-$C_3N_4$ is in the form of mesoporous nanosheets.

19 Claims, 8 Drawing Sheets

(56) References Cited

FOREIGN PATENT DOCUMENTS

RU          2 481 153 C2      5/2013

OTHER PUBLICATIONS

Yao, G., et al. Synthesis and enhanced visible-light photocatalytic activity of wollastonite/g-C3N4 composite. Materials Research Buletin 86 (2017) 186-193. (Year: 2017).*

Wollastonite. In Handbook of Mineralogy. Mineralogical Society of America (2001). Accessed electronically at https://www.handbookofmineralogy.org/pdfs/wollastonite.pdf on Sep. 3, 2025. (Year: 2001).*

Alhaddad, M., et al. Bi2O3/ g-C3N4 nanocomposites as proficient photocatalysts for hydrogen generation from aqueous glycerol solutions beneath visible light. Ceramics International 46 (2020) 24873-24881. (Year: 2020).*

Mishra, B. P. and Parida, K. Orienting Z scheme charge transfer in graphitic carbon nitride-based systems for photocatalytic energy and environmental applications. Journal of Materials Chemistry A, 2021, 9, 10039. (Year: 2021).*

Qamar, M. A.., et al. Synthesis and applications of graphitic carbon nitride (g-C3N4) based membranes for wastewater treatment: A critical review. Heliyon 9 (2023) e12685. (Year: 2023).*

E. Hashemi, et al., "Ternary $Bi_2O_3/(BiO)_2CO_3/g$-$C_3N_4$ multi-heterojunction nanoflakes for highly efficient photocatalytic degradation of dyes and xanthates under visible light", Journal of Science: Advanced Materials and Devices, vol. 10, Issue 1, Dec. 20, 2024, 100834, 15 pages.

* cited by examiner

NANOCOMPOSITE FOR IMMOBILIZING CONTAMINANTS DISPOSED IN AN AQUEOUS MEDIUM

BACKGROUND

Technical Field

The present disclosure is directed to a particulate crystalline nanocomposite, and more particularly, a nanocomposite comprising monoclinic bismuth oxide ($Bi_2O_3$), calcium metasilicate ($CaSiO_3$) and graphitic-carbon nitride ($g$-$C_3N_4$). The nanocomposite has utility in the adsorption of contaminants disposed in an aqueous medium.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Surging industrialization and urban expansion have intensified the release of waste inorganic and organic pollutants into the environment, overwhelming natural purification processes and endangering environmental health. For example, heavy metal contamination—from industries such as chemical manufacturing, textiles, and mining—poses serious environmental and health risks; these heavy metals are toxic, carcinogenic, and non-biodegradable in nature making them particularly hazardous when discharged untreated into water bodies. The ability of heavy metals to enter food chains can lead to severe health issues including cancer, neurological damage, and kidney failure; as a result, effective removal of these contaminants is crucial for environmental protection and human health.

Having regard to exemplary organic contaminants in waste water, some volatile organic compounds have been proven to cause cancer after prolonged exposure. Consuming drinking water with high levels of trichloroethylene and tetrachloroethylene increases the risk of liver problems and cancer. People who drink water that contains high levels of atrazine over many years may be at greater risk for cardiovascular problems and reproductive difficulties. Further, those drink water containing di(2-ethylhexyl) phthalate (DEHP) over a significant duration may be at greater risk for liver problems, reproductive difficulties and cancer.

Many organic contaminants—including polyaromatic hydrocarbons (PAH), manufactured gas plant waste and petroleum products—are recalcitrant which makes their treatment in or removal from waste water complex. Biodegradation using indigenous or introduced microbial organisms is often only effective for low molecular weight organic compounds; it is deleteriously slow for large molecular weight organic compounds, or multi-ring aromatic compounds which exhibit low water solubility and which cannot be facilely transported across cell membranes. This poor mobility and consequent low concentration that partitions into solution—groundwater or soil pore water—lowers the chances that these large organic molecules are even available to microbial organisms for efficient biodegradation.

Further traditional methods for removing organic contaminants, such as coagulation, clarification, membrane filtration and ion exchange, might be feasible but have limitations, including high cost and limited efficiency under real-world conditions. Adsorption, potentially coupled with photocatalytic degradation of organic contaminants—has become a preferred method of contaminant removal on account of its affordability and simplicity. However conventional absorbent materials—such as activated carbon—have drawbacks such as low surface area and lack of visible light activity.

Nanocomposites, particularly those incorporating materials like graphitic carbon nitride ($g$-$C_3N_4$), have emerged as highly promising sorbents for inorganic and organic contaminant removal. Graphitic carbon nitride ($g$-$C_3N_4$) is a metal-free semiconductor which is cost-effective, stable and responsive to visible light, making it an attractive candidate for environmental remediation (Singh, D., et al., *Citric acid coated magnetic nanoparticles: synthesis, characterization and application in removal of Cd (II) ions from aqueous solution*, Journal of Water Process Engineering, 2014. 4: p. 233-241). However, the low surface area of graphitic carbon nitride ($g$-$C_3N_4$), its rapid electron-hole recombination and limited exfoliation present significant drawbacks to its utility. These limitations might be mitigated by incorporating metal oxide nanoparticles or other modifying compounds into the $g$-$C_3N_4$ to enhance the surface area, adsorption capacity and overall performance of the material.

Accordingly, it is one object of the present disclosure to provide provides a nanocomposite material that addresses these limitations by enhancing the adsorption capacity and stability under real-world conditions.

SUMMARY

In an exemplary embodiment, a method of immobilizing contaminants disposed in an aqueous medium is described. The method comprises contacting the aqueous medium with a particulate crystalline nanocomposite for a sufficient contact time to permit adsorption of the contaminants. The particulate crystalline nanocomposite comprises: a monoclinic $Bi_2O_3$ crystalline phase; a $CaSiO_3$ crystalline phase; and, a graphitic-$C_3N_4$ crystalline phase, wherein at least a fraction of the graphitic-$C_3N_4$ is in the form of mesoporous nanosheets.

In some embodiments, the contaminants comprises one or more organic contaminants selected from the group consisting of a polyaromatic hydrocarbon, a halogenated polyaromatic hydrocarbon; a phenol, a halogenated phenol; a furan, a halogenated furan; a dioxine, a halogenated dioxine; a biphenyl, a halogenated phenyl, and an organic dye.

In some embodiments, the contaminants comprise one or more inorganic contaminants selected from the group consisting of a radioactive nuclide; a toxic metal; a heavy metal; and, a metalloid.

In some embodiments, at least a fraction of the $Bi_2O_3$ and at least a fraction of the $CaSiO_3$ of the crystalline nanocomposite are in the form of nanowires.

In some embodiments, at least 50 wt. % of the $Bi_2O_3$ is in the form of nanowires; and, at least 50 wt. % of the $CaSiO_3$ is in the form of nanowires.

In some embodiments, the nanowires of $Bi_2O_3$ and $CaSiO_3$ have a median length of from about 20 to about 100 nm, as determined by Transmission Electron Microscopy.

In some embodiments, at least 50 wt. % of the graphitic-$C_3N_4$ is in the form of mesoporous nanosheets.

In some embodiments, the crystalline nanocomposite has a multimodal pore size distribution, as determined by Barrett-Joyner-Halenda (BJH) desorption analysis.

In some embodiments, the crystalline nanocomposite has a trimodal pore size distribution, as determined by BJH desorption analysis.

In some embodiments, the trimodal pore size distribution of the crystalline nanocomposite has: a first mode in the range of from about 2 to about 6 nm; a second mode in the range of from about 8 to about 12 nm; and, a third mode in the range of from about 14 to about 18 nm.

In some embodiments, the crystalline nanocomposite has a surface area of from about 60 to about 100 $m^2/g$, as determined by Brunauer-Emmett-Teller (BET) analysis.

In some embodiments, the crystalline nanocomposite has a surface area of from about 70 to about 90 $m^2/g$, as determined by BET analysis.

In some embodiments, the crystalline nanocomposite has a pore volume of from about 0.1 to about 0.5 $cm^3/g$, as determined by BJH desorption analysis.

In some embodiments, the crystalline nanocomposite has a pore volume of from about 0.2 to about 0.3 $cm^3/g$, as determined by BJH desorption analysis.

In some embodiments, a method of preparing the particulate crystalline nanocomposite is described. The method comprises: forming a solution of a calcium salt and an alkali metal silicate in a solvent including water and a $C_1$-$C_4$ alkanol; and, heating the solution at a temperature of from about 150 to about 250° C. to form a dry product of $CaSiO_3$. The method further comprises forming graphitic-$C_3N_4$ by heating urea in a closed vessel at a temperature of from about 500 to about 700° C. The method still further comprises: forming an acidified solution in a polar protic solvent of a bismuth salt and reducing sugar; heating the acidified solution at a temperature of from about 150 to about 250° C. for a sufficient duration to carbonize the reducing sugar to form a carbonized product; comminuting the carbonized product of the heating stage; and, calcining the comminuted carbonized product at a temperature of from about 500 to about 1200° C. for a duration of from about 1 to about 5 hours to form $Bi_2O_3$. The method further comprises: dispersing the $CaSiO_3$, graphitic-$C_3N_4$ and $Bi_2O_3$ in a polar protic solvent; heating the dispersion at a temperature of from about 150 to about 250° C. at a pressure of from about 2 to about 8 Bar; and, separating the solid crystalline nanocomposite from the heated dispersion.

In some embodiments, the contact time is from about 1 to about 120 minutes.

In some embodiments, the contact time is from about 5 to about 30 minutes.

In some embodiments, a fixed volume of the aqueous medium is provided in which the particulate crystalline nanocomposite is dispersed.

In some embodiments, a flow of the aqueous medium contacts a membrane in which the particulate crystalline nanocomposite is disposed.

In some embodiments, the particulate crystalline nanocomposite is provided in an amount of from about 0.1 to about 5 grams per liter of the aqueous medium.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
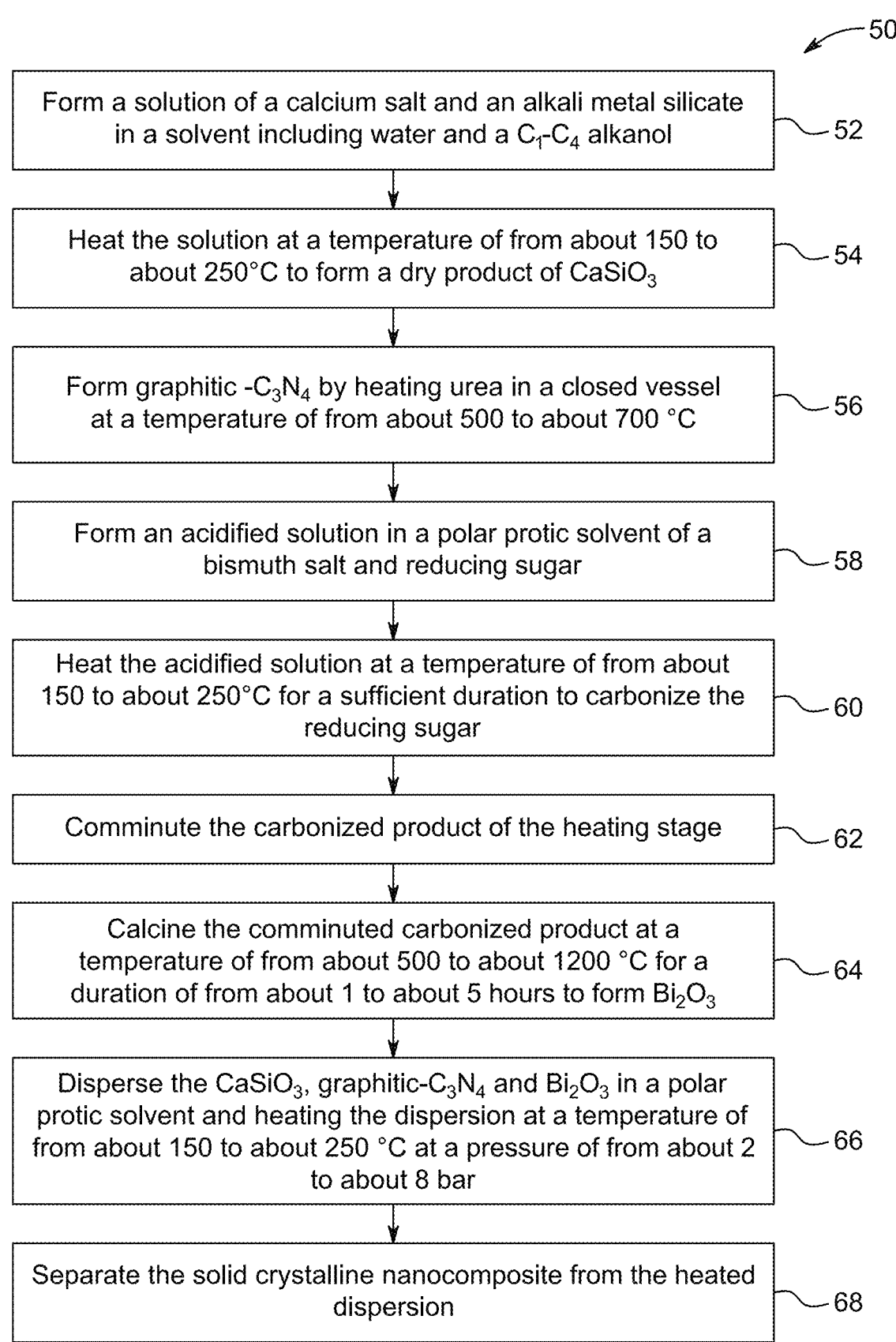
FIG. 1 is a flowchart of an exemplary method of preparing a particulate crystalline nanocomposite, according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term "room temperature" refers to a temperature range of 23 degrees Celsius (° C.)±2° C. in the present disclosure. As used herein, "ambient conditions" means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term "fraction" refers to a numerical quantity which defines a part up to, but not including, 100 percent or the entirety of the thing in question.

As used herein the term "disposed" refers to being positioned, placed, deposited, arranged or distributed in a particular manner.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term "Scanning Electron Microscopy" or "SEM" refers to a surface-imaging technique that produces images of a sample by scanning the sample with a focused beam of electrons. Unless otherwise specified, the SEM shall include all imaging techniques using electron beams for imaging.

As used herein, the term "high-resolution transmission electron microscopy (HRTEM)" refers to a powerful imaging technique used to observe the fine details of materials at the atomic scale. In HRTEM, a high-energy electron beam is transmitted through a thin sample, and the transmitted electrons are used to form detailed images with extremely high resolution.

As used herein, the term "X-ray diffraction" or "XRD" or "X-ray crystallography" refers to basic technique for obtaining information on the atomic structure of crystalline materials used as a standard laboratory technique. Unless otherwise specified, the XRD shall include an analytical technique based on the diffraction of X-rays by matter, especially for crystalline materials. As used herein with respect to X-ray diffraction analysis, "JCPDS" denotes the Joint Committee on Powder Diffraction Standards.

The term "unit cell" as used herein refers to the smallest and simplest volume element (i.e., parallelpiped-shaped block) of a crystal that is completely representative of the unit or pattern of the crystal, such that the entire crystal can be generated by translation of the unit cell. The dimensions of the unit cell are defined by six numbers: dimensions a, b and c; and, angles α, β and γ (Blundel et al., 1976, *Protein Crystallography, Academic Press, the disclosure of which is incorporated herein by reference in its entirety*). A crystal is an efficiently packed array of many unit cells.

The "hexagonal crystalline phase" is characterized by a right rhombic prism unit cell. This means the crystal structure can be described by a unit cell with two equal axes (a) and an included angle of 120 degrees (γ), while the third axis (c) is perpendicular to the plane formed by the two equal axes.

The term "triclinic crystalline phase" refers to a crystal structure in which the unit cell is characterized by three mutually perpendicular aces of unequal length (a≠b≠c) wherein further α≠β≠γ.

An orthorhombic crystalline phase refers to a crystal structure having three mutually perpendicular axes of unequal lengths (a≠b≠c) but wherein the crystal lattice forms a rectangular prism where the edges represent the three axes, all intersecting at 90-degree angles (α=β=γ=) 90°.

A cubic crystalline phase refers to a crystal structure where the unit cell is shaped like a cube, with three equal-length axes that are perpendicular to each other (at 90° angles). In this crystal system, the atoms or ions are arranged in a repeating pattern within the cubic lattice. The cubic crystalline structure is highly symmetric, possessing four threefold rotational axes and three fourfold rotational axes, permitting rotations of 90° around its specific axes and rotations of 120° about the body diagonals of the cube, while maintaining the same structure.

A monoclinic crystalline phase refers to a crystal structure in which the unit cell of the material is characterized by three unequal axes, with two of them forming an angle that is not 90°, while the third axis is perpendicular to the plane formed by the other two axes. In other words, the monoclinic crystal system has one axis that is tilted, resulting in a lack of orthogonality between all three axes. The unit cell in the monoclinic phase is thus asymmetrical, with distinct axial lengths and one non-90° angle.

A tetragonal crystalline phase refers to a crystal structure in which the unit cell of the lattice has two axes of equal-length and a third axis that is of different length, but wherein all axes are at right angles (90°) to each other. This crystal system may be represented as a square base (with two equal axes) and a height (the third axis) which is different, resulting in a rectangular prism-like shape. The tetragonal crystal structure possesses a four-fold rotational symmetry around its unique axis.

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term "particle" refers to a small object that acts as a whole unit with regard to its transport and properties. As used herein, "nanoparticles"-sometimes contracted herein to NPs-refers to particles having a particle size of 1 nanometer (nm) to 1000 nm.

Unless otherwise stated, the term "particle size" refers to the largest axis of the particle. In the case of a generally spherical particle, the largest axis is the diameter.

The term "median volume particle size" (Dv50), as used herein, refers to a particle size corresponding to 50% of the volume of the sampled particles being greater than and 50% of the volume of the sampled particles being smaller than the recited Dv50 value. Similarly, if used, the term "Dv90" refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term "nanocomposite" refers to a composite material in which at least one dimension of a component thereof is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

As used herein, the term "porosity" refers to a measure of the void or vacant spaces within a material. As used herein, the term "pore volume" refers to the total volume of void spaces (pores) within a material that is capable of being filled by a gas or liquid: it is typically expressed in cubic centimeters per gram ($cm^3/g$). As used herein, the term "pore diameter" refers to the median width or size of the pores (void spaces) within a material, typically measured in nm or angstroms (Å).

Pores may be micropores, mesopores, macropores, and/or a combination thereof. The pores exist in the bulk material, not necessarily in the molecular structure of the material. The term 'microporous' means that particulate crystalline nanocomposite have pores with an average pore width (i.e., diameter) of less than 2 nm. The term 'mesoporous' means the pores of the nanocomposite have an average pore width of 2-50 nm. The term 'macroporous' means the pores of the nanocomposite have an average pore width larger than 50 nm. Pore size may be determined by methods including, but not limited to, gas adsorption (e.g., $N_2$ adsorption), mercury intrusion porosimetry, and imaging techniques such as SEM and X-ray computed tomography (XRCT).

Having regard to a parameter distribution of the disclosed material, the term "monomodal" references only one peak being observed in a frequency distribution graph of said parameter. The term "polymodal" references a distribution with two or more distinct peaks or modes. The terms bimodal and trimodal may be utilized herein to reference the presence of two or three modes, respectively.

As used herein, the Brunauer-Emmett-Teller (BET) analysis references the method of measuring the specific surface area ($m^2/g$) of a solid material via the adsorption of gas molecules onto the surface of the solid, as detailed in standard NF ISO 5794-1, Appendix E (June 2010).

As used herein, the Barrett, Joyner, and Halenda (BJH) desorption analysis refers to the method of determining the volume of mesopores per unit mass (mL/g) of a solid material utilizing the adsorption and desorption isotherms associated with gas molecules inside the mesopores of the solid, as detailed in Technical Standard DIN 66134:1998-02.

As used herein, the term "porous particulate nanocomposite" refers to a material composed of discrete particles that form a structure with interconnected pores or voids. These pores allow for the passage of fluids or gases, contributing to the material's overall porosity. The composite typically consists of two or more distinct phases, which may include various inorganic or organic components, and is characterized by its unique morphology, such as irregularly shaped particles or aggregates.

The term "graphitic carbon nitride" often abbreviated to g-$C_3N_4$, refers to a family of carbon nitride compounds with a layered structure similar to graphene. Graphitic carbon nitride may be considered a synthetic polymer primarily composed of carbon and nitrogen, with some hydrogen impurities. In certain embodiments, the graphitic carbon nitride (g-$C_3N_4$) may be present in at least one of the following morphologies: nanorectangles; nanotriangles; nanopentagons; nanohexagons; nanoribbons; nanosheets; nanodiscs; nanoflakes; nanofoils; and, nanobelts.

As used herein, the term "metalloid" refers to a type of element that has properties intermediate between those of metals and nonmetals. Metalloids typically exhibit characteristics such as the ability to conduct electricity and they can form alloys with metals.

As used herein, the term 'organic contaminants' refers to carbon-based compounds, typically derived from industrial, agricultural, or domestic activities, that are present as contaminants in water or the environment. These contaminants may include pesticides, pharmaceuticals, dyes, and other synthetic or natural organic substances that can pose environmental or health risks. Exemplary organic contaminants include dyes, phenols, polycyclic aromatic hydrocarbons, herbicides, pesticides and persistent organic contaminants.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

The term "polar solvent" as used herein refers to a solvent having a dielectric constant ($\varepsilon$) of more than 5 as measured at 25° C. The determination of dielectric constant (8) is known in the art: the use of measured voltages across parallel plate capacitors in such determinations may be mentioned. The term "polar solvent" may encompass both aprotic and protic solvents, wherein protic solvents are those solvents which are capable of yielding or accepting a proton and aprotic solvents are those solvents that do not yield or accept a proton.

Water, for use as a (co-) solvent or diluent herein, is intended to mean water of low solids content as would be understood by a person of ordinary skill in the art. The water may, for instance, be distilled water, demineralized water, deionized water, reverse osmosis water, boiler condensate water, or ultra-filtration water. Tap water may be tolerated in certain circumstances.

As used herein, 'comminuting' refers to process of reducing the average size of solid materials into smaller particles, by crushing, grinding, cutting, vibrating, or other processes.

The term "hydrolysis", as used herein, is the chemical reaction of a molecule with water to produce two or more smaller molecules.

As used herein, 'hydrogen generation rate' (HGR) refers to the amount of hydrogen gas produced per unit of time during a chemical reaction.

The term "sonication" refers to a process that uses sound energy (sonic waves) to agitate particles in a sample. As used herein, the term "ultrasonication" refers to irradiation with ultrasonic waves having a frequency of at least 20 kHz.

Without intention to limit the present disclosure, (ultra) sonication may be performed using an (ultra)sonic bath or an (ultra)sonic probe.

As used herein, the term "calcination" refers to a thermal treatment process which is conducted in the absence of, or under a restricted supply of ambient oxygen. This is performed to remove impurities or volatile substances and/or to induce thermal decomposition or a change in the thermally treated material.

The term "actinic radiation" includes light with wavelengths of electromagnetic radiation ranging from the ultraviolet ("UV") light range, through visible light range, and into the infrared range. Actinic radiation generally has a wavelength of from 150 to 2000 nm.

As used herein, the term 'membrane' refers to a porous structure that is capable of separating components of a homogeneous or heterogeneous fluid. In particular, 'pores' in the sense of a membrane indicate voids permitting fluid communication between different sides of the structure. More particularly in use, when a homogeneous or heterogeneous fluid is passed through the membrane, some components of the fluid can pass through the pores of the membrane into a 'permeate stream', some components of the fluid can be retained by the membrane and can thus accumulate in a 'retentate' and/or some components of the fluid can be rejected by the membrane into a 'rejection stream'. It is not precluded in the present disclosure that both the retenate and the permeate can constitute valuable materials that can be subject to further processing, if required.

Membranes can be of various thicknesses, with homogeneous or heterogeneous structures. The membranes of the present disclosure are neutral or uncharged, and particle transport is considered to be passive, which passive transport can be facilitated by pressure, concentration, and chemical or electrical gradients of the filtration process.

As used herein, the term 'filtration' refers to a mechanical or physical operation that can be employed for the separation of constituents of homogeneous or heterogeneous solutions. Types of filtration can be categorized based on the estimated sizes of chemicals to be separated and can involve particle filtration (>10 micrometer ($\mu$m)); microfiltration (0.1-10 $\mu$m); ultrafiltration (0.01-0.1 $\mu$m); nanofiltration (NF) (0.001-0.01 $\mu$m); and, reverse osmosis, or RO (<0.001 $\mu$m). As used herein, the term 'permeate' refers to a filtered liquid that passes through a membrane during a filtration process, leaving behind larger particles or contaminants.

The term 'shear rate' as used herein, references the rate of increase in the velocity of a fluid flowing in the x direction per unit distance in the orthogonal y direction. The shear rate has units of reciprocal time ($s^{-1}$).

As used herein, "$C_1$-$C_n$ alkyl" group refers to a monovalent group that contains from 1 to n carbons atoms, that is a radical of an alkane and includes straight-chain and branched organic groups. As such, a "$C_1$-$C_4$ alkyl" group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labelled compounds of the disclosure may generally be prepared by conventional techniques known to those skilled in the art or by processes analogous to those described herein, using an appropriate isotopically-labelled reagent in place of the non-labelled reagent otherwise employed.

The present disclosure is intended to include all hydration states of a given compound or formula, unless otherwise noted or when heating a material.

An aspect of the present disclosure is directed to a $Bi_2O_3/CaSiO_3/g$-$C_3N_4$ nanocomposite synthesized through a simple and low-cost method and having utility as a nano-adsorbent for removing water contaminants.

The particulate crystalline nanocomposite comprises, as determinable by X-Ray diffraction: a monoclinic $Bi_2O_3$ crystalline phase; a $CaSiO_3$ crystalline phase, and, a graphitic-$C_3N_4$ crystalline phase. The presence of the monoclinic crystalline phase of $Bi_2O_3$ does not, however, preclude the presence of further crystalline phases of this trioxide compound, typically as the minority phases.

In some embodiments, the ratio by weight of $Bi_2O_3$ to $CaSiO_3$ to graphitic-$C_3N_4$ in the crystalline nanocomposite is about (0.8-1.2):(0.8-1.2):(0.8-1.2). For example, the ratio by weight of $Bi_2O_3$ to $CaSiO_3$ to graphitic-$C_3N_4$ in the crystalline nanocomposite may be about (0.9-1.1):(0.9-1.1): (0.9-1.1). These ranges each encompass a ratio by weight of $Bi_2O_3$ to $CaSiO_3$ to graphitic-$C_3N_4$ of in the crystalline nanocomposite of about 1.0:1.0:1.0, which itself represents a preferred embodiment of the nanocomposite.

TEM is primarily known for its ability to reveal fine structural details at atomic and molecular levels, it may also provide information about the size, shape, distribution, and morphology of pores in porous materials. TEM may reveal the fine details of pore structures, especially in materials with pores in the nanometer range (e.g., mesoporous materials). By imaging thin sections of the material, it may provide high-resolution images that help identify the size, shape, and arrangement of the pores.

In certain embodiments, the graphitic carbon nitride (g-$C_3N_4$) may be present in at least one of the following morphologies: nanorectangles; nanotriangles; nanopentagons; nanohexagons; nanoribbons; nanodiscs; nanoflakes; nanofoils; and, nanobelts.

In some embodiments, TEM images of the crystalline nanocomposite showed a two-dimensional porous structure constructed with curled and wrinkled nanosheets and platelets of the g-$C_3N_4$. In some embodiments, at least a fraction of the graphitic-$C_3N_4$ is in the form of mesoporous nanosheets; for example at least about 50 wt. %, at least about 55 wt. %, at least about 60 wt. %, at least about 65 wt. %, at least about 70 wt. %, at least about 75 wt. %, or at least about 80 wt. % of the graphitic-$C_3N_4$ is in the form of mesoporous nanosheets.

In some embodiments, at least a fraction of the $Bi_2O_3$ and at least a fraction of the $CaSiO_3$ of the crystalline nanocomposite are in the form of nanowires. For example, at least about 50 wt. %, at least about 55 wt. %, at least about 60 wt. %, at least about 65 wt. %, at least about 70 wt. %, at least about 75 wt. %, or at least about 80 wt. % of each of the $Bi_2O_3$ and the $CaSiO_3$ of the crystalline nanocomposite are in the form of nanowires. The nanowires of $Bi_2O_3$ and $CaSiO_3$ may have a median length, as determined by Transmission Electron Microscopy, of from about 20 to about 100 nm, for example from about 25 to about 95 nm, from about 30 to about 90 nm, from about 35 to about 85 nm, from about 40 to about 90 nm, from about 45 to about 90 nm, from about 50 to 90 nm, from about 55 to about 90 nm, from about 60 to about 90 nm, from about 65 to about 90 nm, from about 70 to about 90 nm, from about 75 to about 90 nm, from about 80 to 90 nm or from about 85 to about 90 nm. In a specific embodiment, the nanowires of $Bi_2O_3$ and $CaSiO_3$ have a median length of about 87 nm, as determined by Transmission Electron Microscopy.

In some embodiments, the particulate crystalline nanocomposite has a surface area, as determined by Brunauer-Emmett-Teller (BET) analysis, of from 60 to about 100 $m^2/g$, for example from about 65 to about 95 $m^2/g$, from about 70 to about 90 $m^2/g$, from about 75 to about 85 $m^2/g$ or from about 77 to about 83 $m^2/g$. In a preferred embodiment, the surface area of the crystalline nanocomposite is 79.5 $m^2/g$.

Typically the crystalline nanocomposite has a polymodal pore size distribution, as determined by Barrett-Joyner-Halenda (BJH) desorption analysis. In some embodiments, the crystalline nanocomposite has a trimodal pore size distribution, as determined by BJH desorption analysis. In exemplary embodiments, the trimodal pore size distribution of the crystalline nanocomposite has: a first mode in the range of from about 2 to about 6 nm, for example from about 3 to about 5 nm, or about 3.9 nm; a second mode in the range of from about 8 to about 12 nm, for example from about 9 to about 11 nm, or about 10.3 nm; and, a third mode in the range of from about 14 to about 18 nm, for example from about 15 to about 17 nm, or about 16.39 nm. A polymodal or trimodal pore size distribution in the particulate crystalline nanocomposites, as determined by BJH desorption analysis, enhances the material's functionality by offering multiple distinct pore sizes. The diversity improves adsorption capacity, catalytic efficiency, and mass transport by providing various pore environments that accommodate different molecule sizes.

In some embodiments, the crystalline nanocomposite has a pore volume, as determined by BJH desorption analysis of from about 0.1 to about 0.5 cubic centimeter per gram ($cm^3/g$), for example from about 0.2 to about 0.4 $cm^3/g$, or from about 0.2 to about 0.3 $cm^3/g$. y In an exemplary embodiment, the crystalline nanocomposite has a pore volume of 0.247 $cm^3/g$, as determined by BJH desorption analysis.

FIG. 1 illustrates a schematic flow chart of a method 50 of preparing the particulate crystalline nanocomposite. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes forming a solution of a calcium salt and an alkali metal silicate in a solvent which comprises water and a $C_1$-$C_4$ alkanol.

Exemplary calcium salts, which may be present alone or in combination, include but are not limited to calcium chloride, calcium sulfate, calcium carbonate, calcium phosphate, calcium acetate, calcium citrate, calcium lactate, calcium gluconate, calcium formate, calcium oxalate, calcium tartrate, calcium ascorbate, calcium benzoate, calcium propionate, calcium stearate, calcium hydroxide, calcium peroxide, calcium iodate, calcium molybdate, calcium hypochlorite, calcium thiocyanate, calcium chromate, calcium ferrite, calcium bromide, calcium fluoride, calcium sulfide, calcium arsenate, calcium tungstate, calcium borate, calcium perchlorate, and calcium hydride. In an embodiment, the calcium salt is selected from the group consisting of calcium sulfate ($CaSO_4$), calcium nitrate ($Ca(NO_3)_2$), calcium chloride ($CaCl_2$)) and calcium acetate ($Ca(CH_3COO)_2$). In a preferred embodiment, calcium salt is calcium nitrate.

Exemplary alkali metal silicates, which may be present alone or in combination, include but are not limited to potassium silicate, lithium silicate, rubidium silicate, cesium silicate, sodium orthosilicate, potassium orthosilicate, lithium orthosilicate, rubidium orthosilicate, cesium orthosilicate, sodium disilicate, potassium disilicate, lithium disilicate, rubidium disilicate, cesium disilicate, sodium trisilicate, potassium trisilicate, lithium trisilicate, rubidium trisilicate, cesium trisilicate, sodium tetrasilicate, potassium tetrasilicate, lithium tetrasilicate, rubidium tetrasilicate, cesium tetrasilicate, sodium hexasilicate, potassium hexasilicate, lithium hexasilicate, rubidium hexasilicate, and cesium hexasilicate. In a preferred embodiment, alkali metal silicate is sodium metasilicate.

In some embodiments, the molar ratio of the calcium salt to the alkali metal silicate is from about 1:5 to 5:1, for example about 1:4 to 4:1, about 3:1 to 1:3, about 1:2 to 2:1, or about 1:1.

Exemplary C1-C4 alkanols, which may be present alone or in combination, include but are not limited to methanol, propanol, isopropanol, butanol, isobutanol, sec-butanol, tert-butanol, 1-propanol, 2-propanol, 1-butanol, 2-butanol, methylpropanol, dimethylpropanol, ethylpropanol, cyclopropanol, fluoromethanol, chloromethanol, bromomethanol, and iodomethanol. In a preferred embodiment, the C1-C4 alkanol comprises or consists of ethanol.

In an embodiment of step 52, the volume-by-volume (v/v) ratio of water to C1-C4 alkanol is in the range of about 1:5 to 5:1, for example about 1:4 to 4:1, about 1:3 to 3:1, or about 1:2 to 2:1. In a preferred embodiment, the v/v ratio of water to C1-C4 alkanol is 1:1.

At step 54, the method 50 includes heating the solution at a temperature of from about 150 to about 250° C. to form a dry product of $CaSiO_3$. This step involves the chemical reaction and dehydration process that are necessary for converting the precursor materials into the desired solid product. In some embodiments, heating takes place at temperature of from about 110 to about 210° C., for example from about 120 to about 220° C., from about 130 to about 230° C., from about 140 to about 220° C., from about 150 to about 210° C., from about 160 to about 200° C., from about 170 to about 190° C., or about 180° C. to form the dry product of $CaSiO_3$. The solution is preferably heated in an autoclave; optionally, other known heating appliances may be used.

At step 56, the method 50 includes forming graphitic-$C_3N_4$ by heating urea in a closed vessel at a temperature of about 500 to about 700° C. In some embodiments, the urea is heated in a closed vessel at a temperature in a range from about 500 to about 700° C., for example from about 550 to about 700° C., from about 600 to about 700° C., or from about 650 to about 700° C. In a preferred embodiment, the urea is heated in a closed vessel at about 600° C. In some embodiments, the urea is heated in a closed vessel for a duration of from about 10 to about 60 minutes, for example from about 20 to about 60 minutes, from about 30 to about 60 minutes, from about 40 to about 60 minutes, from about 50 to about 60 minutes. In a preferred embodiment, the urea is heated in a closed vessel for about 45 minutes.

At step 58, the method 50 includes forming an acidified solution in a polar protic solvent of a bismuth salt and a reducing sugar.

Exemplary acids having utility in the acidifying of the solution include, but are not limited to, phosphoric acid, hydrofluoric acid, hydrobromic acid, hydroiodic acid, perchloric acid, chloric acid, bromic acid, iodic acid, selenic acid, telluric acid, carbonic acid, silicic acid, boric acid, chromic acid, manganic acid, periodic acid, arsenic acid, antimonic acid, stannic acid, phosphorous acid, hypophosphorous acid, hypochlorous acid, chlorous acid, hypobromous acid, bromous acid, hypoiodous acid, iodous acid, perbromic acid, periodic acid and carbonic acid. In some embodiments, the acidified solution may include an acid selected from the group consisting of hydrochloric acid (HCl), sulfuric acid ($H_2SO_4$), perchloric acid ($HClO_4$), boric acid ($H_3BO_3$), and nitric acid ($HNO_3$). In an exemplary embodiment, the acid is $HNO_3$.

Independently of, or additional to the use of these acids, it is preferred that the acidified aqueous solution has a pH of from about 2 to about 6, for example of from about 2 to about 5 or from about 3 to about 5.

Exemplary bismuth salts, which may be used alone or in combination, include bismuth nitrate, bismuth subsalicylate and bismuth carbonate. In a preferred embodiment, the bismuth salt is bismuth nitrate.

Suitable examples of reducing sugar include, but are not limited to, glucose, fructose, galactose, ribose, maltose and lactose. These reducing sugars may facilitate the reduction of various metallic ions to their lower oxidation states in an acidified aqueous solution, depending on the specific reaction and desired product. In some embodiments, the reducing sugar may be selected from monosaccharides, disaccharides, oligosaccharides, or polysaccharides. In a preferred embodiment, the reducing sugar is a monosaccharide selected from the group consisting of trioses, tetroses, pentoses, hexoses and heptoses. In another preferred embodiment, the reducing sugar is selected from the group consisting of erythrose, threose, erythrulose, ribose, arabinose, xylose, lyxose, ribulose, arabulose, xylulose, lyxulose, glucose, mannose, galactose, allose, altrose, talose, gulose, idose, fructose, psicose, sorbose, tagatose, and sedoheptulose. In yet another preferred embodiment, the reducing sugar is xylose.

Exemplary polar protic solvents for step 58, which may be used alone or in combination, include but are not limited to: water and C1-C4 alkanols. In a preferred embodiment, the polar protic solvent of step 58 comprises or consists of water.

In some embodiments, the w/w ratio of the bismuth salt to the reducing sugar is about 1:5 to 5:1, for example from about 1:4 to 4:1, from about 1:3 to 3:1, from about 1:2 to 2:1, or about 1:1.

At step 60, the method 50 includes heating the acidified solution at a temperature of from about 150 to about 250° C. for a sufficient duration to carbonize the reducing sugar, such as xylose, in the presence of the acidified solution. The temperature range ensures efficient carbonization while preventing decomposition of the desired product. During the heating stage, the reducing sugar undergoes dehydration and polymerization to form a black carbonaceous material, which serves as the precursor for further processing.

In some embodiments, the acidified solution is heated at a temperature in a range from 150 to 250° C., for example from about 175 to about 250° C. or from about 175 to about 2225° C. In a preferred embodiment, the solution is heated at 200° C. In some embodiment, the acidified solution is heated for a duration of from about 1 to about 5 hours, for example from about 1.5 to about 5 hours, from about 2 to about 5 hours, from about 2.5 to about 5 hours, from about 3 to about 5 hours, from about 3.5 to about 5 hours, from about 4 to about 5 hours, or from about 4.5 to about 5 hours. In a preferred embodiment, the acidified solution is heated for 3 hours.

At step 62, the method 50 includes comminuting the carbonized product of the heating stage, typically by grinding or milling in a mortar and pestle or a ball mill, to reduce the particle size to a desired range, such as from about 50 to about 200 microns, to facilitate further processing. The comminution process ensures uniformity in the particle size, which is crucial for subsequent calcination and synthesis steps.

At step 64, the method 50 includes calcining the comminuted carbonized product at a temperature of from about 500 to about 1200° C., for example from about 510 to about 650° C., or about 550° C. Without intention to limit the present disclosure, calcination may be performed for a duration of from about 1 to about 5 hours, for example from about 2.5 to about 4.5 hours, or about 4 hours to form $Bi_2O_3$. The calcination is carried out by heating it to a high temperature under a restricted supply of ambient oxygen. This is performed to remove impurities or volatile substances and to incur thermal decomposition. Typically, the calcination is carried out in a furnace, conventionally equipped with a temperature control system, which may provide a heating rate of up to about 50° C./min, for example up to about 40° C./min, up to about 30° C./min, up to about 20° C./min, up to about 10° C./min, or up to about 5° C./min.

At step 66, the method 50 includes dispersing the $CaSiO_3$, graphitic-$C_3N_4$ and $Bi_2O_3$ in a polar protic solvent and heating the dispersion: at a temperature of from about 150 to about 250° C.; and, at a pressure of from about 2 to about 8 Bars. In some embodiments, the mixture may optionally be further sonicated or ultrasonicated to enhance the dispersion of $CaSiO_3$, graphitic-$C_3N_4$, and $Bi_2O_3$ in the polar protic solvent by using (ultra)sonic waves to break up agglomerates and promote a uniform mixture.

Exemplary polar protic solvents for step 66 include, but are not limited to, methanol, isopropanol, n-propanol, butanol, isobutanol, tert-butanol, pentanol, hexanol, cyclohexanol, ethylene glycol, propylene glycol, glycerol, formamide, mono($C_1$-$C_4$)alkyl ethers of ethylene glycol, mono($C_1$-$C_4$) alkyl ethers of propylene glycol dimethylformamide (DMF), acetic acid, propionic acid, lactic acid, formic acid, citric acid, phosphoric acid, trifluoroacetic acid, water, ammonia, methylamine, ethylamine, isopropylamine, n-propylamine, butylamine, sec-butylamine, tert-butylamine, diethylamine, dipropylamine, dimethylamine, triethylamine, triethanolamine, n-methylformamide (NMF), n-methylacetamide (NMA), hydrazine, hydroxylamine, and urea. In an exemplary embodiment, the polar protic solvent is a $C_1$-$C_4$ alkanol. In a preferred embodiment, the polar protic solvent is selected from the group consisting of mono($C_1$-$C_4$)alkyl ethers of ethylene glycol. An exemplary polar protic solvent is ethylene glycol monomethyl ether.

In some embodiments, the solution is heated at a temperature in a range from about 150 to about 250° C., for example from about 170 to about 250° C., from about 190 to about 250° C., from about 210 to about 250° C., or from about 230 to about 250° C. In an exemplary embodiment, the solution is heated at about 180° C. In some embodiments, the solution is heated for a duration of from about 1 to about 5 hours, for example from about 1.5 to about 5 hours, from about 2 to about 5 hours, from about 2.5 to about 5 hours, from about 3 to about 5 hours, from about 3.5 to 5 hours, from about 4 to about 5 hours, from about 4.5 to about 5 hours. In an exemplary embodiment, the solution is heated for a duration of from about 2 to about 4 hours. In an alternative embodiment, the solution is heated for about 1 hour. In some embodiments, the solution is heated at about 180° C. at pressure ranging from about 2 to about 8 bar, for example from about 3 to about 8 bar, from about 4 to about 8 bar, from about 5 to about 8 bar, from about 6 to about 8 bar, or from about 7 to about 8 bar. In a preferred embodiment, the solution is heated at a pressure is about 5 bar.

At step 68, the method 50 includes separating the solid crystalline nanocomposite from the heated dispersion. This separation may be achieved using techniques such as filtration (e.g., gravity filtration, vacuum filtration, pressure filtration, or membrane filtration), centrifugation, decantation, gas flotation, capacitance-based separation, or microfiltration. Alternative separation methods include natural and forced sedimentation, magnetic separation, vacuum distillation, chemical conversion, and chromatography. In a preferred embodiment, filtration is performed via a Buchner system.

It is not precluded that the separated particulate crystalline nanocomposite be subjected to further processing. Such further processing may be performed in a single stage or multistage manner and may include one or more of: washing with water; drying; and, comminuting the nanocomposite in order to moderate particle morphology or the particle size distribution thereof. Exemplary drying conditions include a temperature of from about 50 to about 200° C., such as from about 100 to about 200° C. or from about 120 to about 180° C. Such drying may be carried out using known heating methods, such as a vacuum oven, rotary evaporator, microwave-assisted drying process, freeze-drying, and infrared drying.

A method of immobilizing contaminants disposed in an aqueous medium using the crystalline particulate nanocomposite is described. In some embodiment, the contaminants include organic contaminants selected from the group consisting of: polyaromatic hydrocarbons and their halogenated derivatives; phenols and their halogenated derivatives; furanes and their halogenated derivatives; dioxines and their halogenated derivatives; biphenyls and their halogenated derivatives; and, organic dyes. In some embodiment, the contaminants include one or more organic contaminants selected from the group consisting of a polyaromatic hydrocarbon, a halogenated polyaromatic hydrocarbon; a phenol, a halogenated phenol; a furan, a halogenated furan; a dioxine, a halogenated dioxine; a biphenyl, a halogenated phenyl, and an organic dye.

In some embodiments, the organic contaminant is a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIASH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythrosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a] pyrene, corannulene, benzo[g,h,i]perylene, coronene, ovalene, benzo[c]fluorine, acenaphthene, acenaphthylene, benz

[a]anthracene, benzo[b]fluoranthene, benzo[j]fluoranthene, benzo[k]fluoranthene, benzo[e]pyrene, cyclopenta[c,d] pyrene, dibenz[a,h]anthracene, dibenzo[a,e]pyrene, dibenzo [a,h]pyrene, dibenzo[a,i]pyrene, dibenzo[a,1]pyrene, fluoranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciprofloxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic contaminant is a toxic organic chemical that adversely affects human and environmental health, can be transported by wind and water, and can persist for years, decades, or centuries owing to resistance to environmental degradation by natural chemical, biological, or photolytic processes. Persistent organic contaminants are regulated by the United Nations Environment Programme 2001 Stockholm Convention on Persistent Organic Contaminants. Examples of persistent organic contaminants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane (α- and β-), hexabromodiphenyl ether, lindane, pentachlorobenzene, tetrabromodiphenyl ether, perfluorooctanesulfonic acid, endosulfans, and hexabromocyclododecane.

The immobilization onto the particulate nanocomposite of inorganic contaminants disposed within aqueous media is also envisaged. In some embodiments, the contaminants include inorganic contaminants selected from the group consisting of arsenic, lead, mercury, cadmium, chromium, nickel, copper, zinc, cobalt, manganese, aluminum, selenium, barium, beryllium, antimony, silver, strontium, uranium, radium, fluoride, chloride, nitrate, nitrite, sulfate, phosphate, cyanide, ammonium, perchlorate, and borate. In some embodiments, the contaminants include inorganic contaminants selected from the group consisting of radioactive nuclides; toxic metals; heavy metals; and, metalloids.

The method of immobilizing contaminants disposed in an aqueous medium of the present disclosure requires that aqueous medium to be brought into contact with the particulate nanocomposite material for a sufficient contact time to permit adsorption of the contaminants concerned. Without intention to limit the present disclosure, the contact time aqueous medium with the particulate crystalline nanocomposite may be from about 1 to about 120 minutes, for example from about 1 to about 90 minutes, from about 1 to about 60 minutes, from about 1 to about 30 minutes or from about 5 to about 30 minutes. Independently of, or in addition to the aforementioned exemplary contact time, the particulate crystalline nanocomposite may be provided in an amount ranging from about 0.1 to about 5 grams per liter of the aqueous medium for said contacting. For example, the particulate crystalline nanocomposite may be provided in an amount of from about 2 to about 5 grams per liter, from about 3 to about 5 grams per liter or from about 4 to about 5 grams per liter of the aqueous medium.

The aqueous medium may be provided as a static volume in which the nanocomposite material is dispersed. In an alternative embodiment, the aqueous medium may be provided as a fixed volume in which the nanoparticulate is dispersed but which is subjected to agitation: the nanoparticulate material may be suspended in the volume or may be constrained within a bed or membrane or by a support. In a further non-limiting alternative, the aqueous medium may be provided as a flow which contacts the particulate nanocomposite material. In this embodiment, the particulate nanocomposite material may need to constrained within a bed or, more particularly, a membrane which the aqueous medium contacts as either a perpendicular or tangential (cross-) flow stream.

Perpendicular flow filtration may be preferred where the aqueous medium feed is characterized by a low concentration of particulates given that there would be reduced residue build up on the surface of the membrane during filtration. Whilst perpendicular flow filtration may be performed continuously, it is preferably performed in a batch or semi-continuous manner, permitting the membrane to be cleaned between use cycles to remove residue build-up.

As noted, membrane separation by tangential flow filtration is not precluded in the present disclosure where the membrane comprises the afore-described particulate nanocomposite material. Conventionally, the retentate stream in tangential flow filtration is recycled. It is also typical for tangential flow filtration to be performed as a continuous process because a constant flow of the feed stream across the surface of the ultrafiltration membrane may prevent the accumulation of residues on the surface thereof.

Where membrane filtration of the aqueous medium is conducted by tangential flow filtration, the feed of the aqueous medium may be represented as a laminar flow and thereby characterized by a shear rate. The shear rate of the aqueous medium may typically be from about 1000 to about 10000 s$^{-1}$, for example from about 2000 to about 10000 s$^{-1}$, from about 2000 to about 8000 s$^{-1}$ or from about 4000 to about 8000 s$^{-1}$.

Independently of the use of direct flow or tangential flow filtration where a membrane comprising the particulate nanocomposite material is utilized, the step of contacting may preferably be performed at a transmembrane pressure differential, specifically a pressure difference between the retentate and permeate side of the membrane. Whilst the tolerance limit of the membrane may be a determinative of the operable transmembrane pressure differential, it is conventional herein to apply a transmembrane pressure differential of from about 50 to about 500 kPa. Exemplary transmembrane pressure differentials of from about 50 to about 400 kPa, about 50 to about 300 kPa or about 100 to about 300 kPa may be mentioned.

The transmembrane pressure differential may be controlled by inter alia: pressurizing the feed stream of the aqueous medium with a gas; adjusting the column height of the feed stream of the aqueous medium above the membrane; through the use of pumps to adjust the flow rate of the fluids on the retentate side of the membrane; through controlling drainage on the permeate side of the membrane; and/or, through the use of suction applied to the permeate side of the membrane.

The transmembrane pressure differential may be maintained at a constant value within the aforementioned ranges during the contacting step. In the alternative, the transmembrane pressure differential may be moderated to provide a constant permeate flow rate: typically in this circumstance, the transmembrane pressure differential will increase during an contacting step or cycle and should, of course, be monitored to ensure that the pressure tolerance limit of the membrane is not exceeded.

EXAMPLES

The following examples demonstrate a method of immobilizing contaminants disposed in an aqueous medium though contacting the medium with a $Bi_2O_3/CaSiO_3/g$-$C_3N_4$ nanocomposite.

The examples are provided solely for illustration and are not to be construed as limitations of the present disclosure, as many variations thereof are possible without departing from the scope of the present disclosure.

Example 1: Fabricating the $CaSiO_3$

According to the present disclosure, equimolar amounts of calcium nitrate and sodium metasilicate were dispersed in 100 ml of ethanol:water (ratio by volume, 1:1) in a 150 mL glass beaker and sonicated for 15 min. The mixture was transferred to a 200 mL autoclave and then placed in an oven operated at 180° C. for 2.0 h. The product was dispersed in 500 ml distilled water with an ultrasonic bath for 10 minutes, filtered via a Buchner system, rinsed with distilled water, and dried at 120° C. for 1.0 h.

Example 2: Fabricating the $g$-$C_3N_4$

About 30.0 grams (g) of urea was placed in a 250 mL porcelain crucible, covered with its porcelain cover, then the whole crucible and cover were wrapped with three layers of aluminum foil to reduce urea loss by evaporation. The crucible was heated via a furnace set at 600° C. for 45 minutes.

Example 3: Fabricating the $Bi_2O_3$

About 10.0 bismuth nitrate and 10.0 g of xylose were placed in a 500 ml beaker. 100 mL ethylene glycol monomethyl ether was added to the mixture which was then heated until a clear solution was obtained. 10 mL of concentrated nitric acid was added to the mixture, which was then heated until the carbonization of xylose. The mixture was placed in an oven set at 200° C. for 3.0 hours; the black carbonized product was milled in a mortar, placed in a 150 mL porcelain dish, and calcined at 550° C. for 4.0 hours.

Example 4: Fabricating the $Bi_{2O3}@CaSiO_3@g$-$C_3N_4$

Equal amounts of $CaSiO_3$, $g$-$C_3N_4$, and $Bi_2O_3$ was transferred to a mono wave-200 vial (G30), dispersed in 20 mL ethylene glycol monomethyl ether via an ultrasonic bath for 30 minutes. The vial was closed with its Teflon cover and placed in the Anton-Baar Monowave-200 operated at 180° C. and 5.0 bar pressure for one hour. The product was dispersed in 1 L distilled water with an ultrasonic bath for 30 minutes, filtered via a Buchner system, rinsed with distilled water, and dried at 150° C. for 2.0 hours.

Figure 2:
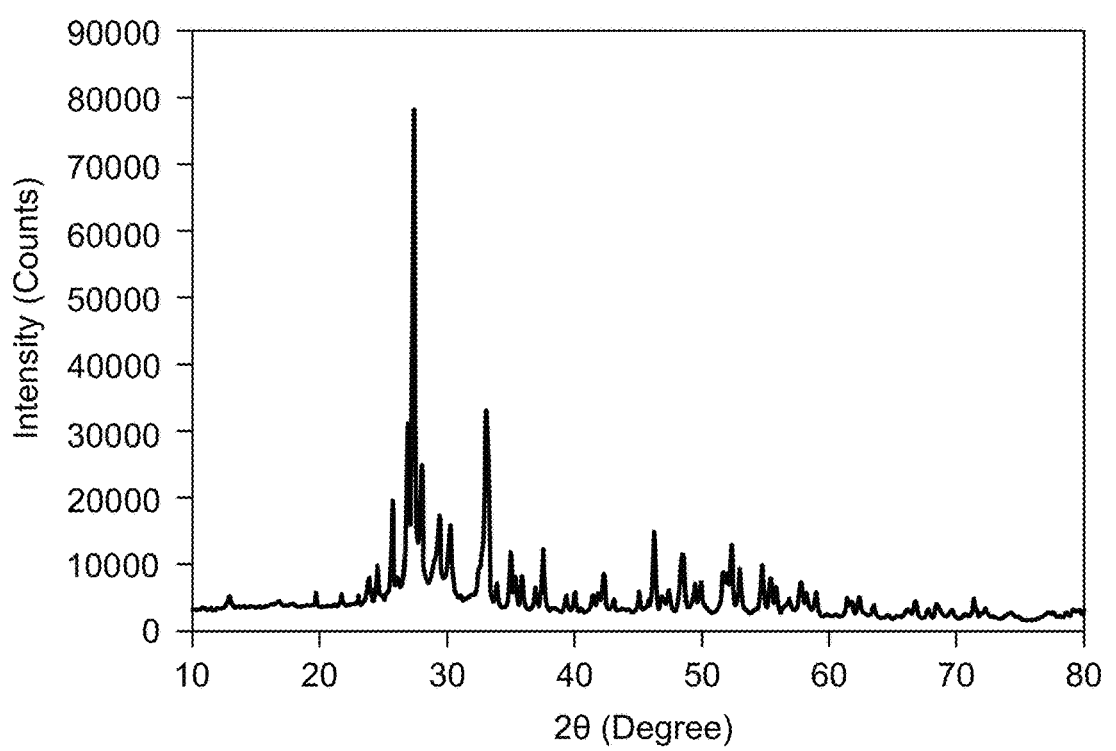
FIG. 2 is X-Ray diffraction (XRD) diffractogram of a $Bi_2O_3/CaSiO_3/g$-$C_3N_4$ nanocomposite, according to certain embodiments.

The crystallinity and phases identification present in the $Bi_2O_3/CaSiO_3/g$-$C_3N_4$ catalyst was analyzed by X-ray diffraction (XRD), and the results are given in FIG. 2. The intense peaks and high-intensity values indicate that the powder is highly crystalline. Examination of the diffraction patterns with the standard powder diffraction file (PDF) cards reveals the presence of $Bi_2O_3$ as the most prominent phase and $CaSiO_3$ and $g$-$C_3N_4$ as minor phases. The $Bi_2O_3$ phase was indexed to the 2θ values of 25.7, 26.9, 27.4, 28.0, 33.0, 33.2, 35.0, and 46.3°. These diffractions are, respectively, assigned to (002), (−112), (−121), (012), (−122), (−202), (−212), and (−223) plans of the monoclinic phase of $Bi_2O_3$ (JCPDS Card No. 00-027-0053, the disclosure which is incorporated herein by reference in its entirety). The $CaSiO_3$ phase (JCPDs Card No. 01-072-2297, the disclosure which is incorporated herein by reference in its entirety) was detected at 2θ values of 23.9, 26.9, and 30.2°. These diffractions were respectively coming from (31-1), (20-2), and (320). The diffractions related to $g$-$C_3N_4$ were observed at 19.6, 27.4, and 33.9° (JCPDS Card No. 01-070-1037, the disclosure which is incorporated herein by reference in its entirety). No other phases were detected, indicating the successful fabrication of $Bi_2O_3/CaSiO_3/g$-$C_3N_4$.

Figure 3A:
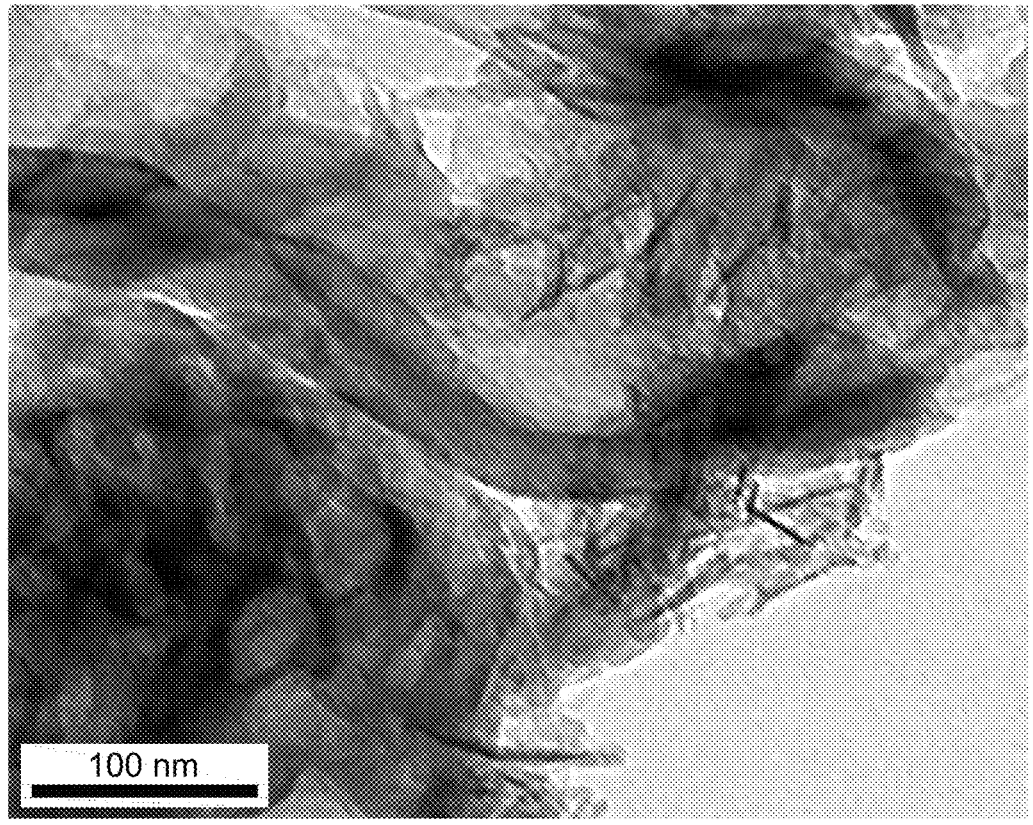
FIG. 3A shows a transmission electron microscopy (TEM) image of the $Bi_2O_3/CaSiO_3/g$-$C_3N_4$ particulate crystalline nanocomposite at 100 nm scale, according to certain embodiments.
Figure 3B:
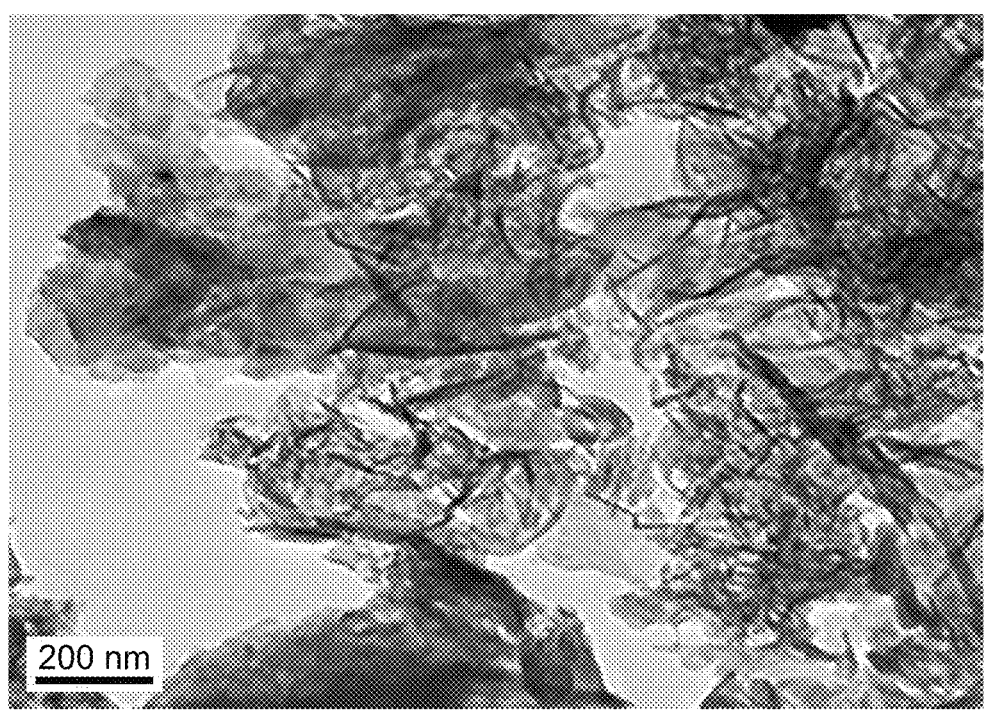
FIG. 3B shows the TEM image of the $Bi_2O_3/CaSiO_3/g$-$C_3N_4$ particulate crystalline nanocomposite at 200 nm scale, according to certain embodiments.
Figure 3C:
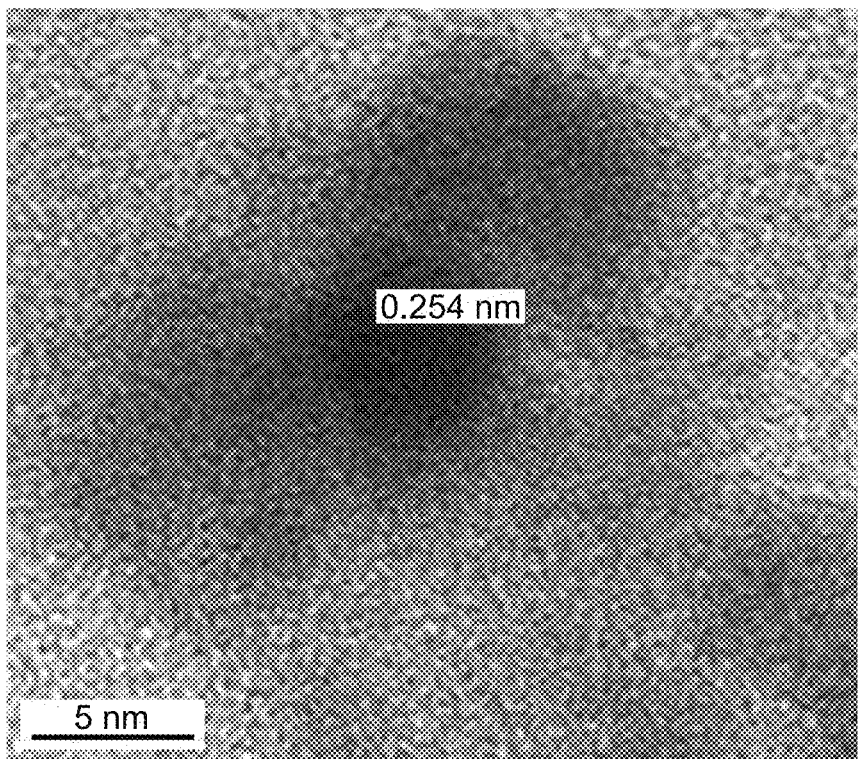
FIG. 3C shows a high-resolution transmission electron microscopy (HRTEM) of the $Bi_2O_3/CaSiO_3/g$-$C_3N_4$ particulate crystalline nanocomposite, according to certain embodiments.
Figure 3D:
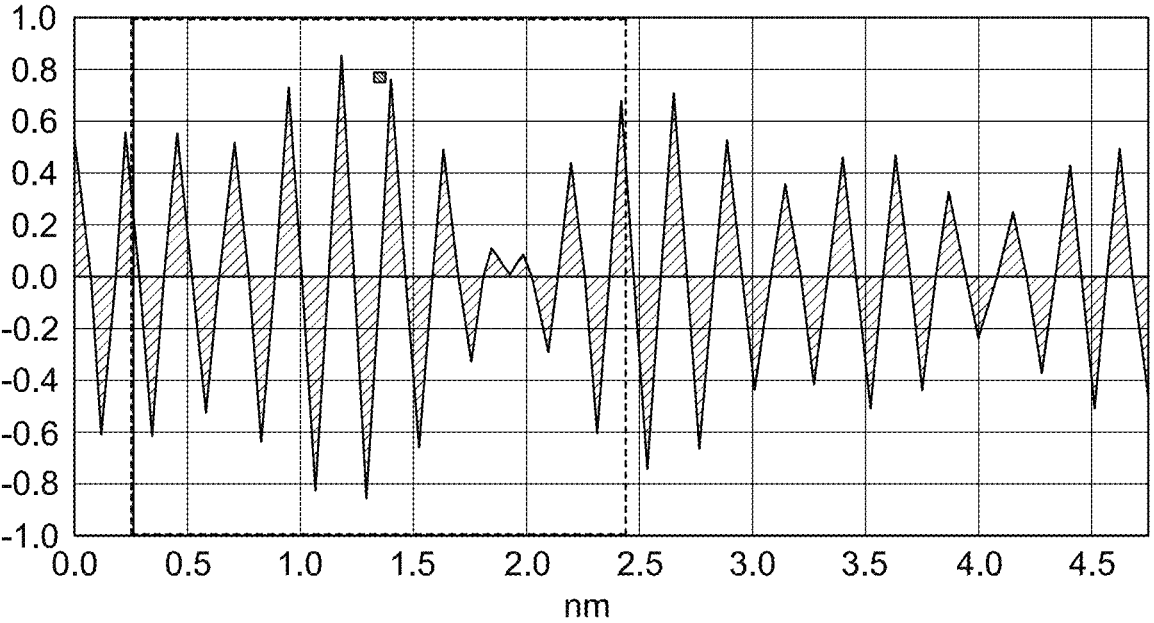
FIG. 3D shows a Fast Fourier transform (FFT) measurement of the $Bi_2O_3/CaSiO_3/g$-$C_3N_4$ particulate crystalline nanocomposite, according to certain embodiments.
Figure 3E:
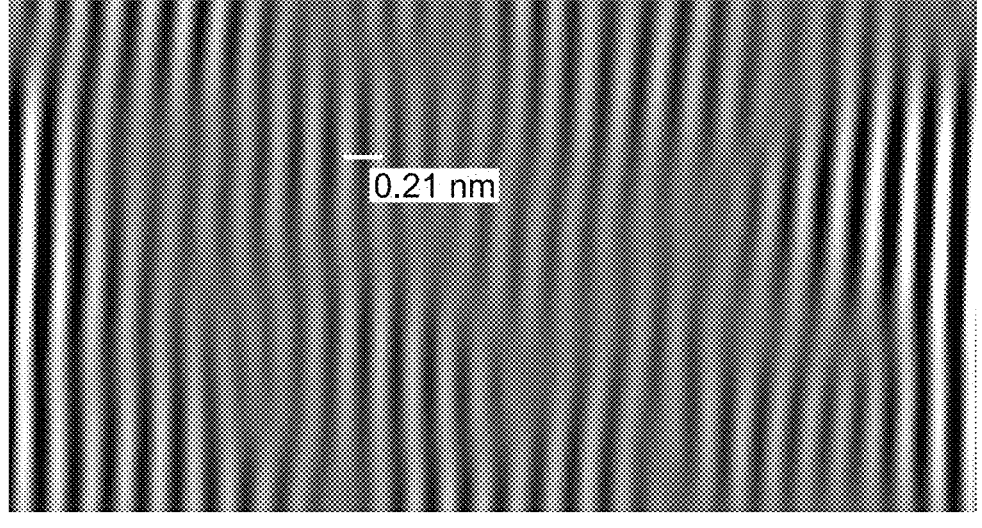
FIG. 3E shows a statistical line profile of an Inverse Fast Fourier Transform (IFFT) of the $Bi_2O_3/CaSiO_3/g$-$C_3N_4$ particulate crystalline nanocomposite showing the d-spacing value, according to certain embodiments.

Transmission electron microscopy (TEM) images of the synthesized $Bi_2O_3/CaSiO_3@$ $g$-$C_3N_4$ nanocomposite are presented in FIGS. 3A-3B. The TEM images showed a two-dimensional porous structure constructed with curled and wrinkled nanosheets and platelets of the $g$-$C_3N_4$ (FIG. 3A). The image also shows a homogeneous dispersion of nanowires of metal oxides-having a median length of 87 nanometers (nm)—on nanosheets of $g$-$C_3N_4$. The corresponding High-Resolution Transmission Electron Microscopy (HRTEM) of the composite shows a plane spacing of 0.25 nm related to the (−212) of $Bi_2O_3$ (FIG. 3C). The Fast Fourier transform (FFT), and inverse Fast Fourier transform (IFFT) measurements show a d-value of 0.21 nm given to $Bi_2O_3/CaSiO_3@$ $g$-$C_3N_4$ nanocomposite, signifying the lattice spacing of ((−223), indicating the development of $Bi_2O_3$ structure (FIG. 3D and FIG. 3E).

Figure 4A:
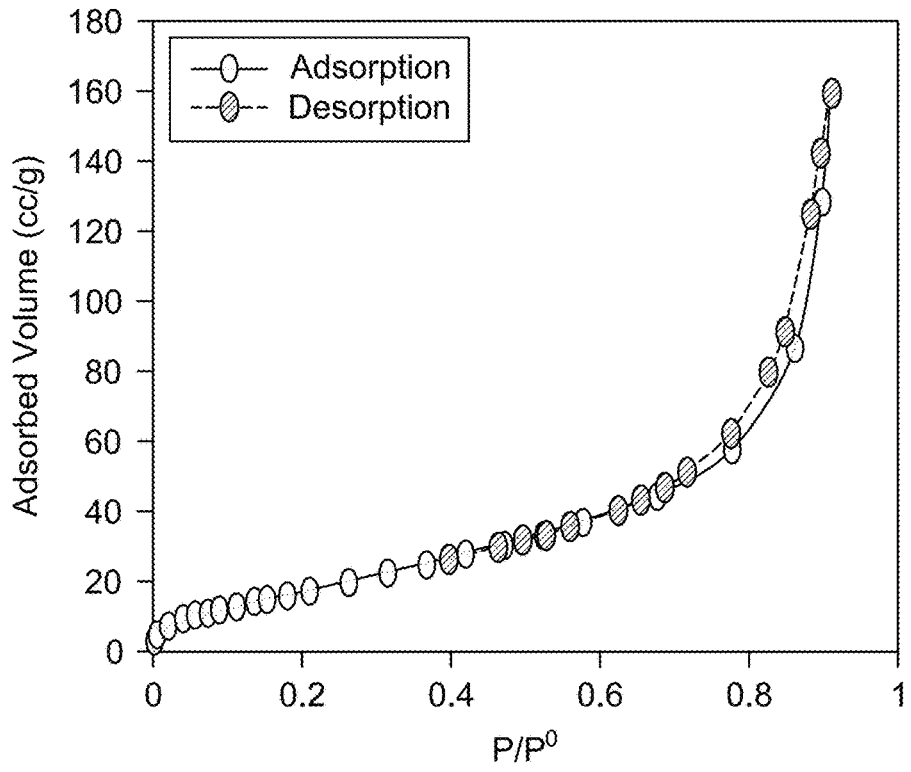
FIG. 4A is graph depicting $N_2$ adsorption-desorption isotherms of the $Bi_2O_3/CaSiO_3/g$-$C_3N_4$, according to certain embodiments.
Figure 4B:
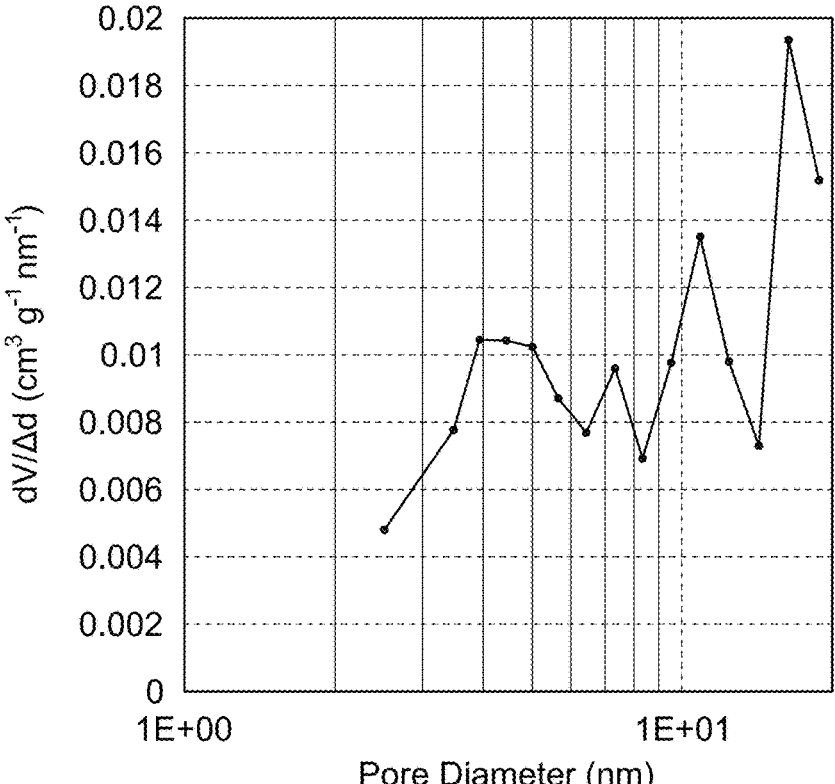
FIG. 4B is graph depicting pore size distribution of the $Bi_2O_3/CaSiO_3/g$-$C_3N_4$, according to certain embodiments.

FIGS. 4A-4B display the nitrogen adsorption-desorption isotherms of $Bi_2O_3/CaSiO_3@$ $g$-$C_3N_4$ nanocomposite. The composite's nitrogen sorption isotherm belongs to type IV with a narrow hysteresis loop, indicating the formation of mesoporous structures. However, shifting the loop to a relatively higher pressure (P/P°=0.69-1) suggests the presence of wide mesopores may result from the deposition of metal oxide particles in the wide pores of $g$-$C_3N_4$. Furthermore, the Brunauer-Emmett-Teller (BET) surface area of the $Bi_2O_3/CaSiO_3/g$-$C_3N_4$ sample was calculated to be 79.5 meter square per gram ($m^2$ $g^{-1}$). The marked high specific surface area reflects the good dispersion of these metal oxide nanoparticles on $g$-$C_3N_4$. and $CaSiO_3$. Moreover, the pore size distribution curves, plotted using the Barrett-Joyner-Halenda (BJH) method, for the $Bi_2O_3/CaSiO_3@g$-$C_3N_4$ sample exhibited trimodal distribution with modes (or average pore diameters maxima) at 3.9, 10.3, and 16.39 nm. The pore volume of the $Bi_2O_3/CaSiO_3/g$-$C_3N_4$ sample was determined by BJH desorption analysis to be 0.247 cubic per gram ($cm^3$ $g^{-1}$). All the isotherms of the $Bi_2O_3/CaSiO_3/g$-$C_3N_4$ sample belong to the category $H_3$ type of pores, which do not exhibit limiting adsorption at high P/P° and arise due to aggregation of plate-like particles giving rise to slit-shaped pores; this indicates that $Bi_2O_3/CaSiO_3@g$-$C_3N_4$ composite assembly provoked a mesoporous array.

Example 5: Adsorption 0.05 g of sorbent was measured in a separate 150 ml beaker. 100 mL of the 100 mg $L^{-1}$ basic fuchsin (BF) solution was poured into each beaker. A portion of the mixture was withdrawn till the BF sorption reached the equilibrium. The aliquots were filtered via a 0.22 μm syringe filter, and the absorbance was measured utilizing a UV-Vis-spectrophotometer ($\lambda$=550 nm).

The contact time study of BF and sorption onto the as-prepared nanocomposite was studied. The BF and absorbance measured during the study were employed for calculating their remaining concentrations (unadsorbed) at each time interval via Eq. 1. Using Eq. 2 was utilized to calculate the adsorption capacity at each period (the BF or milligrams adsorbed onto one gram of sorbent, $q_t$, mg g$^{-1}$).

$$C_t = \frac{\text{Absorbance}_{sample}}{\text{Absorbance}_{standard}} \times conc._{standard} \quad (1)$$

$$q_t = \frac{(C_o - C_t)V}{m}, \quad (2)$$

wherein: Co the initial concentration; Ct concentration at time, t; Vis the Volume of solution used; and, m is the mass of adsorbent.

Figure 5:
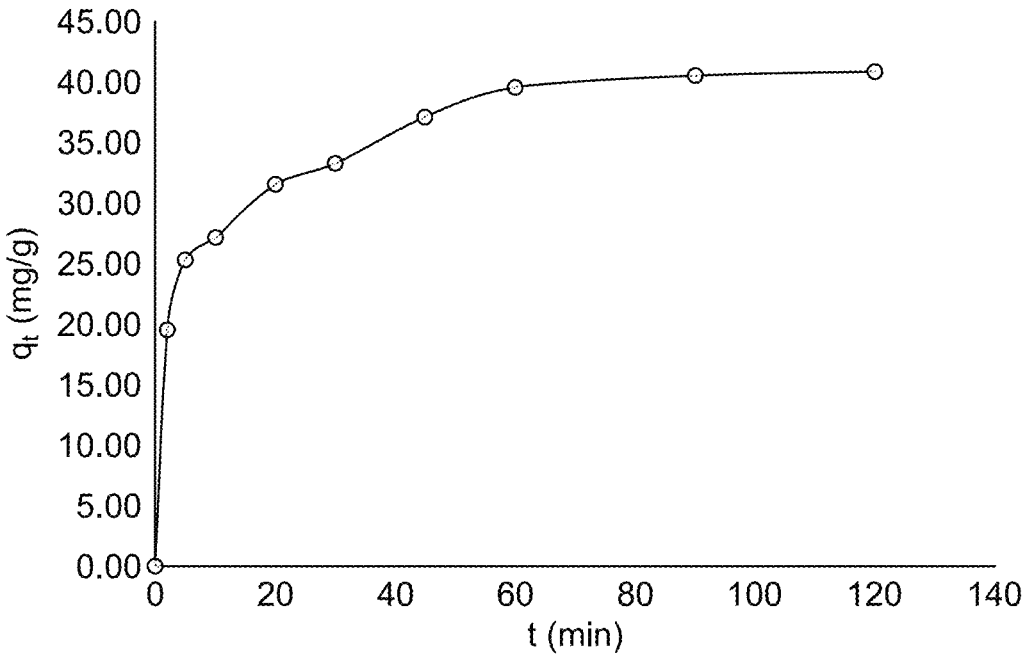
FIG. 5 is graph depicting the contact time investigation of basic fuchsin (BF) sorption onto the $Bi_2O_3@CaSiO_3@g$-$C_3N_4$ nanocomposite, according to certain embodiments.

FIG. 5 demonstrates the adsorption trend of BF onto prepared nanocomposite. The Bi$_2$O$_3$@CaSiO$_3$@g-C$_3$N$_4$ showed q$_t$ values of 40.8 mg/g; these results reflected the capability of the Bi$_2$O$_3$@CaSiO$_3$@g-C$_3$N for treating water contaminated by organic pollutants. Notably, almost 90% of the gained q$_t$ value was acquired within the first 30 minutes, and the overall sorption processes reached equilibrium within 90 minutes, presenting the Bi$_2$O$_3$@CaSiO$_3$@g-C$_3$N$_4$ as a fast treatment sorbent.

Example 6: Adsorption Rate Order

The adsorption rate order of basic fuchsin (BF) removal by Bi$_2$O$_3$@CaSiO$_3$@g-C$_3$N$_4$ was studied via pseudo-first-order (PF, Eq. 3) and pseudo-second-order (PS, Eq. 4) kinetic models.

$$\ln(q_e-q_t)=\ln q_e-k_1 \cdot t \quad (3)$$

$$\frac{1}{q_t} = \frac{1}{k_2 \cdot q_e^2 t} + \frac{1}{q_e} \quad (4)$$

Figure 6:
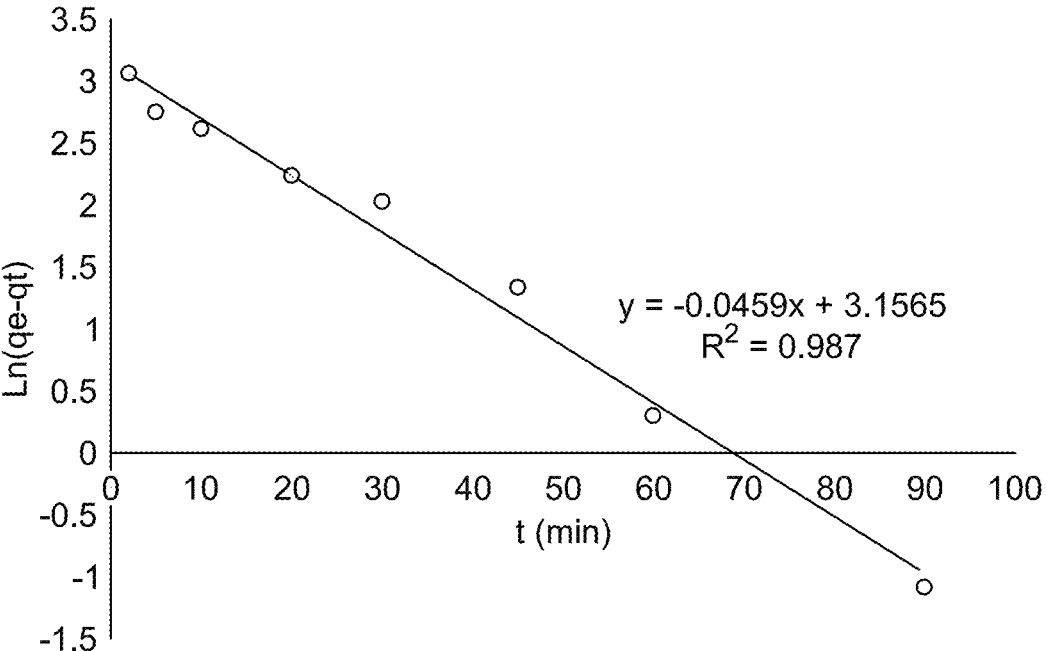
FIG. 6 is graph depicting pseudo-first order (PF) investigation of basic fuchsin (BF) sorption onto the $Bi_2O_3@CaSiO_3@g$-$C_3N_4$ composite, according to certain embodiments.
Figure 7:
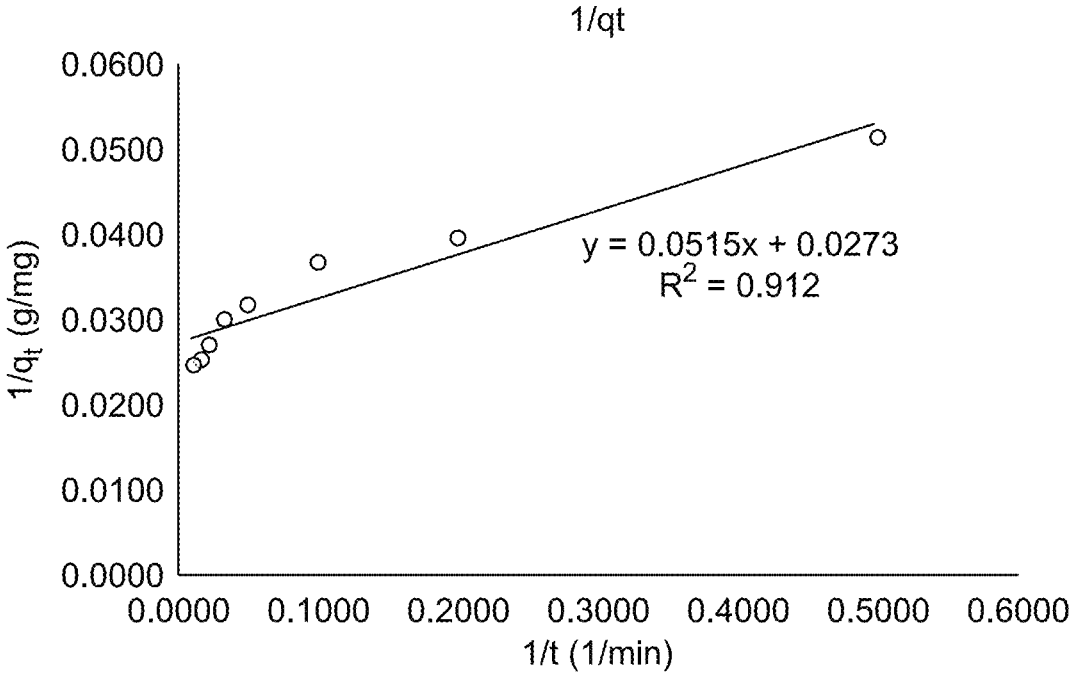
FIG. 7 is graph depicting pseudo-second order (PS) investigation of basic fuchsin (BF) sorption onto the $Bi_2O_3@CaSiO_3@g$-$C_3N_4$ composite, according to certain embodiments.

The symbol q$_e$ (mg/g) represents the equilibrium adsorption capacity. The PF and PS constants are also time-dependent, with the former represented as k$_1$ (min$^{-1}$) and the latter as k$_2$ (g mg$^{-1}$ min$^{-1}$). The PF plot of the BF adsorption onto Bi$_2$O$_3$@CaSiO$_3$@g-C$_3$N$_4$ nanocomposite is depicted in FIG. 6. Additionally, FIG. 7 illustrates the PS plots of BF sorption onto Bi$_2$O$_3$@CaSiO$_3$@g-C$_3$N$_4$. The rate-order output of BF removal illustrated that the sorption on Bi$_2$O$_3$@CaSiO$_3$@g-C$_3$N$_4$ showed better fitting to the PF model.

Example 7: Adsorption Control Mechanism

The rate-control mechanism of BF removal by Bi$_2$O$_3$@CaSiO$_3$@g-C$_3$N$_4$ was studied using the intraparticle (IPD, Eq. 5) and the liquid-film (LFD, Eq. 6) diffusion model.

$$q_t = K_{IP} * t^{\frac{1}{2}} + C_i \quad (5)$$

$$\ln(1-F)=-K_{LF}*t \quad (6)$$

24

The IPD constant is denoted by K$_{IPD}$ (mg g$^{-1}$ min$^{-1/2}$), and the LFD constant is designated by K$_{LFD}$ (min$^{-1}$). C$_i$: the boundary layer factor, expressed as mg g$^{-1}$.

Figure 8:
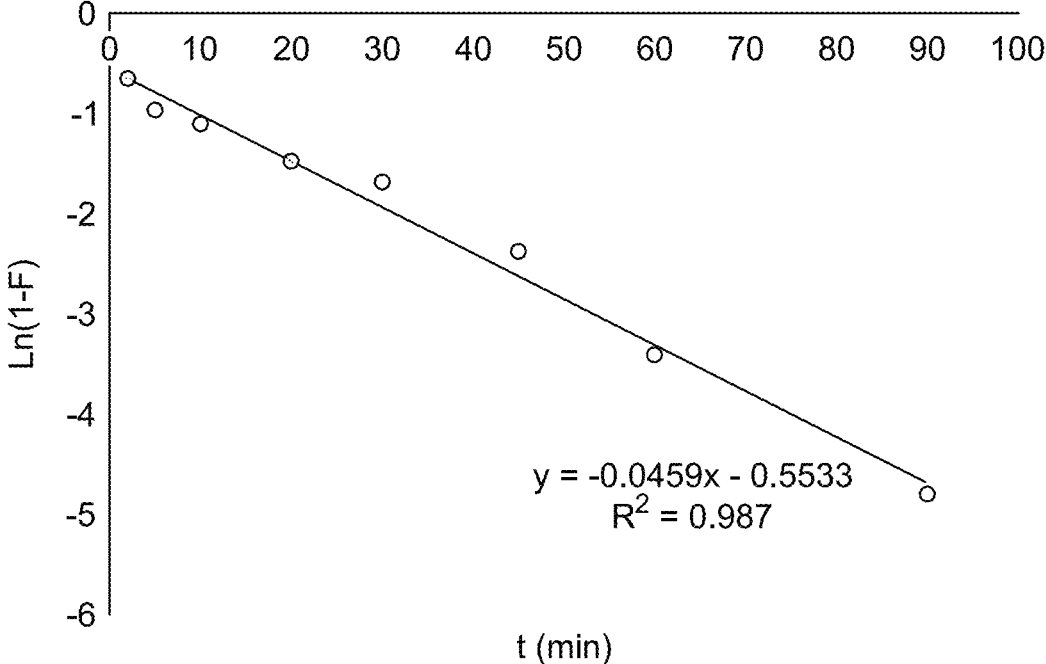
FIG. 8 is graph depicting liquid-film diffusion (LFD) investigation of basic fuchsin (BF) sorption onto the $Bi_2O_3@CaSiO_3@g$-$C_3N_4$ composite, according to certain embodiments.
Figure 9:
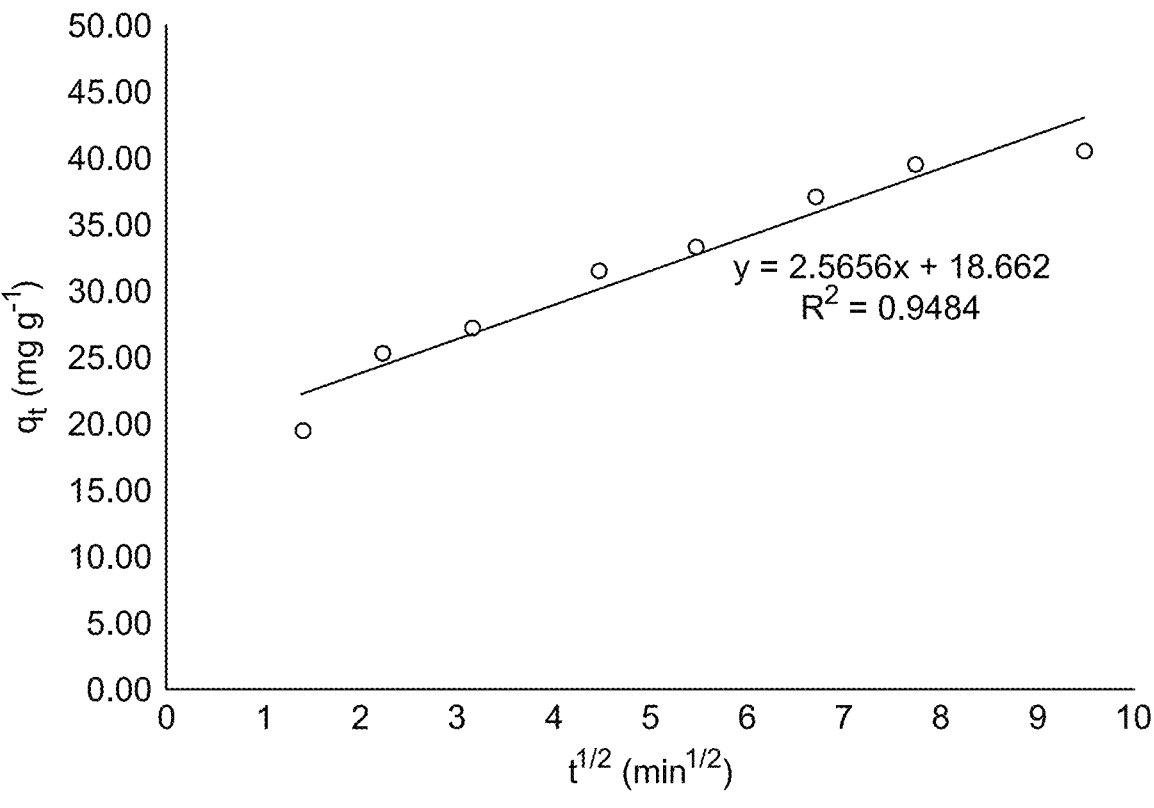
FIG. 9 is graph depicting intra-particle diffusion (IPD) investigation of basic fuchsin (BF) sorption onto the $Bi_2O_3@CaSiO_3@g$-$C_3N_4$ composite, according to certain embodiments.

The LFD plot of the BF adsorption onto Bi$_2$O$_3$@CaSiO$_3$@g-C$_3$N$_4$ nanocomposite was depicted in FIG. 8. Additionally, FIG. 9 illustrated the IPD plots of BF sorption onto Bi$_2$O$_3$@CaSiO$_3$@g-C$_3$N$_4$. The rate-control output of BF removal illustrated that the LF controlled the sorption on the fabricated Bi$_2$O$_5$@CaSiO$_3$@g-C$_3$N$_4$ nanocomposite Numerous modifications and variations of the present disclosure are possible in light of the above teachings. It is therefore to be understood that within the scope of the appended claims, the invention may be practiced otherwise than as specifically described herein.

The invention claimed is:

1. A method of immobilizing contaminants disposed in an aqueous medium, the method comprising:
    contacting the aqueous medium with a particulate crystalline nanocomposite for a sufficient contact time to permit adsorption of the contaminants,
    the particulate crystalline nanocomposite comprising:
        a monoclinic Bi$_2$O$_3$ crystalline phase;
        a CaSiO$_3$ crystalline phase; and,
        a graphitic-C$_3$N$_4$ crystalline phase,
    wherein at least a fraction of the graphitic-C$_3$N$_4$ is in the form of mesoporous nanosheets,
    wherein at least a fraction of the Bi$_2$O$_3$ and at least a fraction of the CaSiO$_3$ of the crystalline nanocomposite are in the form of nanowires.

2. The method according to claim 1, wherein the contaminants comprise one or more organic contaminants selected from the group consisting of a polyaromatic hydrocarbon, a halogenated polyaromatic hydrocarbon; a phenol, a halogenated phenol; a furan, a halogenated furan; a dioxine, a halogenated dioxine; a biphenyl, a halogenated phenyl, and an organic dye.

3. The method according to claim 1, wherein the contaminants comprise one or more inorganic contaminants selected from the group consisting of a radioactive nuclide; a toxic metal; a heavy metal; and, a metalloid.

4. The method according to claim 1, wherein:
    at least 50 wt. % of the Bi$_2$O$_3$ is in the form of nanowires; and,
    at least 50 wt. % of the CaSiO$_3$ is in the form of nanowires.

5. The method according to claim 4, wherein the nanowires of Bi$_2$O$_3$ and CaSiO$_3$ have a median length of from about 20 to about 100 nm, as determined by Transmission Electron Microscopy.

6. The method according to claim 1, wherein at least 50 wt. % of the graphitic-C$_3$N$_4$ is in the form of mesoporous nanosheets.

7. The method according to claim 1, wherein the crystalline nanocomposite has a trimodal pore size distribution, as determined by BJH desorption analysis.

8. The method according to claim 7, wherein the trimodal pore size distribution of the crystalline nanocomposite has:
    a first mode in the range of from about 2 to about 6 nm;
    a second mode in the range of from about 8 to about 12 nm; and,
    a third mode in the range of from about 14 to about 18 nm.

9. The method according to claim 1, wherein the crystalline nanocomposite has a surface area of from about 60 to about 100 m$^2$/g, as determined by Brunauer-Emmett-Teller (BET) analysis.

10. The method according to claim 1, wherein the crystalline nanocomposite has a surface area of from about 70 to about 90 m$^2$/g, as determined by BET analysis.

11. The method according to claim 1, wherein the crystalline nanocomposite has a pore volume of from about 0.1 to about 0.5 cm$^3$/g, as determined by BJH desorption analysis.

12. The method according to claim 1 further comprising preparing the particulate crystalline nanocomposite by:

forming a solution of a calcium salt and an alkali metal silicate in a solvent comprising water and a C$_1$-C$_4$ alkanol;

heating the solution at a temperature of from about 150 to about 250° C. to form a dry product of CaSiO$_3$;

forming graphitic-C$_3$N$_4$ by heating urea in a closed vessel at a temperature of from about 500 to about 700° C.;

forming an acidified solution in a polar protic solvent of a bismuth salt and reducing sugar;

heating the acidified solution at a temperature of from about 150 to about 250° C. for a sufficient duration to carbonize the reducing sugar;

comminuting the carbonized product of the heating stage;

calcining the comminuted carbonized product at a temperature of from about 500 to about 1200° C. for a duration of from about 1 to about 5 hours to form Bi$_2$O$_3$;

dispersing the CaSiO$_3$, graphitic-C$_3$N$_4$ and Bi$_2$O$_3$ in a polar protic solvent and heating the dispersion at a temperature of from about 150 to about 250° C. at a pressure of from about 2 to about 8 Bar; and, separating the solid crystalline nanocomposite from the heated dispersion.

13. The method according to claim 1, wherein the contact time is from about 1 to about 120 minutes.

14. The method according to claim 1, wherein the contact time is from about 5 to about 30 minutes.

15. The method according to claim 1, wherein a fixed volume of the aqueous medium is provided in which the particulate crystalline nanocomposite is dispersed.

16. The method according to claim 1, wherein a flow of the aqueous medium contacts a membrane in which the particulate crystalline nanocomposite is disposed.

17. The method according to claim 1, wherein the particulate crystalline nanocomposite is provided in an amount of from about 0.1 to about 5 grams per liter of the aqueous medium.

18. A method of immobilizing contaminants disposed in an aqueous medium, the method comprising:

contacting the aqueous medium with a particulate crystalline nanocomposite for a sufficient contact time to permit adsorption of the contaminants, the particulate crystalline nanocomposite comprising:

a monoclinic Bi$_2$O$_3$ crystalline phase;

a CaSiO$_3$ crystalline phase; and a graphitic-C$_3$N$_4$ crystalline phase, wherein at least a fraction of the graphitic-C$_3$N$_4$ is in the form of mesoporous nanosheets, and wherein the crystalline nanocomposite has a multimodal pore size distribution, as determined by Barrett-Joyner-Halenda (BJH) desorption analysis.

19. A method of immobilizing contaminants disposed in an aqueous medium, the method comprising:

contacting the aqueous medium with a particulate crystalline nanocomposite for a sufficient contact time to permit adsorption of the contaminants, the particulate crystalline nanocomposite comprising:

a monoclinic Bi$_2$O$_3$ crystalline phase;

a CaSiO$_3$ crystalline phase; and, a graphitic-C N$_4$ crystalline phase, wherein at least a fraction of the graphitic-C$_3$N$_4$ is in the form of mesoporous nanosheets, wherein the crystalline nanocomposite has a pore volume of from about 0.2 to about 0.3 cm$^3$/g, as determined by BJH desorption analysis.

* * * * *